US008584152B2

(12) United States Patent
Ogura et al.

(10) Patent No.: US 8,584,152 B2
(45) Date of Patent: Nov. 12, 2013

(54) DISC DRIVE WITH HEAT DISSIPATING VENTILATION

(75) Inventors: Motonari Ogura, Osaka (JP); Yukihiro Iwata, Osaka (JP); Hiroshi Moriya, Kyoto (JP); Hiroki Takamori, Osaka (JP)

(73) Assignee: Panasonic Corporation, Osaka (JP)

( * ) Notice: Subject to any disclaimer, the term of this patent is extended or adjusted under 35 U.S.C. 154(b) by 1 day.

(21) Appl. No.: 13/056,808

(22) PCT Filed: Jan. 4, 2010

(86) PCT No.: PCT/JP2010/000004
§ 371 (c)(1),
(2), (4) Date: Jan. 31, 2011

(87) PCT Pub. No.: WO2010/079732
PCT Pub. Date: Jul. 15, 2010

(65) Prior Publication Data
US 2011/0138406 A1    Jun. 9, 2011

(30) Foreign Application Priority Data

Jan. 7, 2009  (JP) ................................. 2009-001399
Jan. 8, 2009  (JP) ................................. 2009-002301

(51) Int. Cl.
*G11B 33/14*   (2006.01)
*G11B 33/12*   (2006.01)

(52) U.S. Cl.
USPC ......... 720/649; 720/652; 361/679.5; 361/690

(58) Field of Classification Search
USPC ................................ 720/600, 648, 649, 652; 361/679.49–679.52, 690–697
See application file for complete search history.

(56) References Cited

U.S. PATENT DOCUMENTS

| 5,200,945 | A | * | 4/1993 | Engler et al. ..................... 369/99 |
| 5,493,457 | A | * | 2/1996 | Kawamura et al. ........... 720/648 |
| 5,813,243 | A | * | 9/1998 | Johnson et al. .............. 62/259.2 |
| 7,690,008 | B2 | | 3/2010 | Shizuya et al. |
| 2004/0066727 | A1 | | 4/2004 | Wu et al. |
| 2005/0086675 | A1 | * | 4/2005 | Lee et al. ....................... 720/648 |
| 2005/0102690 | A1 | * | 5/2005 | Huang ........................ 720/649 |

(Continued)

FOREIGN PATENT DOCUMENTS

| CN | 1866388 A | 11/2006 |
| JP | 4-330694 | 11/1992 |

(Continued)

OTHER PUBLICATIONS

Office Action dated Apr. 1, 2013 issued in corresponding CN Application No. 201080002056.0.

*Primary Examiner* — Craig A. Renner
*Assistant Examiner* — Adam B Dravininkas
(74) *Attorney, Agent, or Firm* — McDermott Will & Emery LLP (57) ABSTRACT

The electronic device pertaining to an embodiment comprises a housing that holds an optical disk. The housing comprises a holding space holding an optical disk, a first internal space being apart from the holding space and in which a first electronic component controlling a pickup is disposed, an intake channel leading from the first internal space to the holding space, and an exhaust channel leading from the holding space to a specific space being distinct from the first internal space.

9 Claims, 9 Drawing Sheets

(56) References Cited

U.S. PATENT DOCUMENTS

| | | | |
|---|---|---|---|
| 2005/0168935 A1* | 8/2005 | Inoue et al. | 361/685 |
| 2005/0216926 A1* | 9/2005 | Chang | 720/649 |
| 2006/0184951 A1* | 8/2006 | Shizuya et al. | 720/601 |
| 2006/0265721 A1* | 11/2006 | Shizuya et al. | 720/600 |
| 2006/0288358 A1 | 12/2006 | Wu et al. | |
| 2007/0006241 A1 | 1/2007 | Wang et al. | |
| 2007/0097635 A1* | 5/2007 | Chang | 361/695 |
| 2007/0133167 A1* | 6/2007 | Wagner et al. | 361/687 |
| 2007/0150909 A1* | 6/2007 | Fujimoto et al. | 720/648 |
| 2007/0277185 A1* | 11/2007 | Isoshima et al. | 720/601 |

FOREIGN PATENT DOCUMENTS

| | | |
|---|---|---|
| JP | 5-33397 | 4/1993 |
| JP | 2001-155479 | 6/2001 |
| JP | 2003-85964 | 3/2003 |
| JP | 2003-151259 | 5/2003 |
| JP | 2003-249070 | 9/2003 |
| JP | 2004-241024 | 8/2004 |
| JP | 2006-40376 | 2/2006 |
| JP | 2007-4894 | 1/2007 |
| JP | 2007-172799 | 7/2007 |
| JP | 2007-324339 | 12/2007 |
| JP | 2008-16067 | 1/2008 |

* cited by examiner

FIG. 3B disk rotation direction

DISC DRIVE WITH HEAT DISSIPATING VENTILATION

RELATED APPLICATIONS

This application is the U.S. National Phase under 35 U.S.C. §371 of International Application No. PCT/JP2010/000004, filed on Jan. 4, 2010, which in turn claims the benefit of Japanese Application Nos. 2009-001399, filed on Jan. 7, 2009 and 2009-002301, filed on Jan. 8, 2009, the disclosures of which Applications are incorporated by reference herein.

TECHNICAL FIELD

The present invention relates to an electronic device that reads optical disk information.

BACKGROUND ART

Modern electronic devices that read optical disk information (such as DVD players, DVD recorders, Blu-Ray Disc players, and Blu-Ray Disc recorders) are becoming lighter, thinner, and smaller. Consequently, there is less design latitude inside the electronic devices, making it difficult to ensure enough space to install fans and ducts inside the electronic devices.

In view of this, Patent Citations 1 and 2 propose methods for improving heat dissipation in the holding space in which the optical disk is held, without the use of a fan, by using a swirl flow generated by the rotation of the optical disk. The term "swirl flow" refers to a flow of air that is swirled by centrifugal force from the center part of the optical disk toward the outer peripheral part, directly under the optical disk. Taking into account the fact that optical disks rotate at extremely high speeds of 2000 to 5000 rpm, it is useful to take advantage of this swirl flow.

PRIOR ART PUBLICATIONS

Patent Citations

Patent Citation 1: Japanese Laid-Open Patent Application 2004-241024
Patent Citation 2: Japanese Laid-Open Patent Application 2001-155479

DISCLOSURE OF INVENTION

Technical Problem

With Patent Citations 1 and 2, however, no consideration is given to the overall heat dissipation inside the electronic device. Accordingly, heat dissipation cannot be efficiently promoted in electronic components (such as power supplies or IC chips) disposed in an internal space other than the holding space.

The present invention was conceived in light of the above situation, and it is an object thereof to provide an electronic device with which the overall heat dissipation can be promoted inside the electronic device.

Technical Solution

The electronic device pertaining to an aspect of the present invention comprises a housing holding an optical disk; a holding space holding the optical disk; a rotary support portion supporting the optical disk and rotating the optical disk, and provided within the holding space; a pickup reading recorded data on the optical disk, and provided movably in the holding space; a first internal space being apart from the holding space and in which a first electronic component controlling the pickup is disposed; an intake channel leading from the first internal space to the holding space; and an exhaust channel leading from the holding space to a specific space being distinct from the first internal space.

Advantageous Effects

With the electronic device of the present invention, the overall heat dissipation inside the electronic device can be promoted.

BEST MODE FOR CARRYING OUT THE INVENTION

An embodiment of the present invention will be described through reference to the drawings. The reproduction device pertaining to this embodiment is an example of an electronic device that reads optical disk information.

Figure 1:
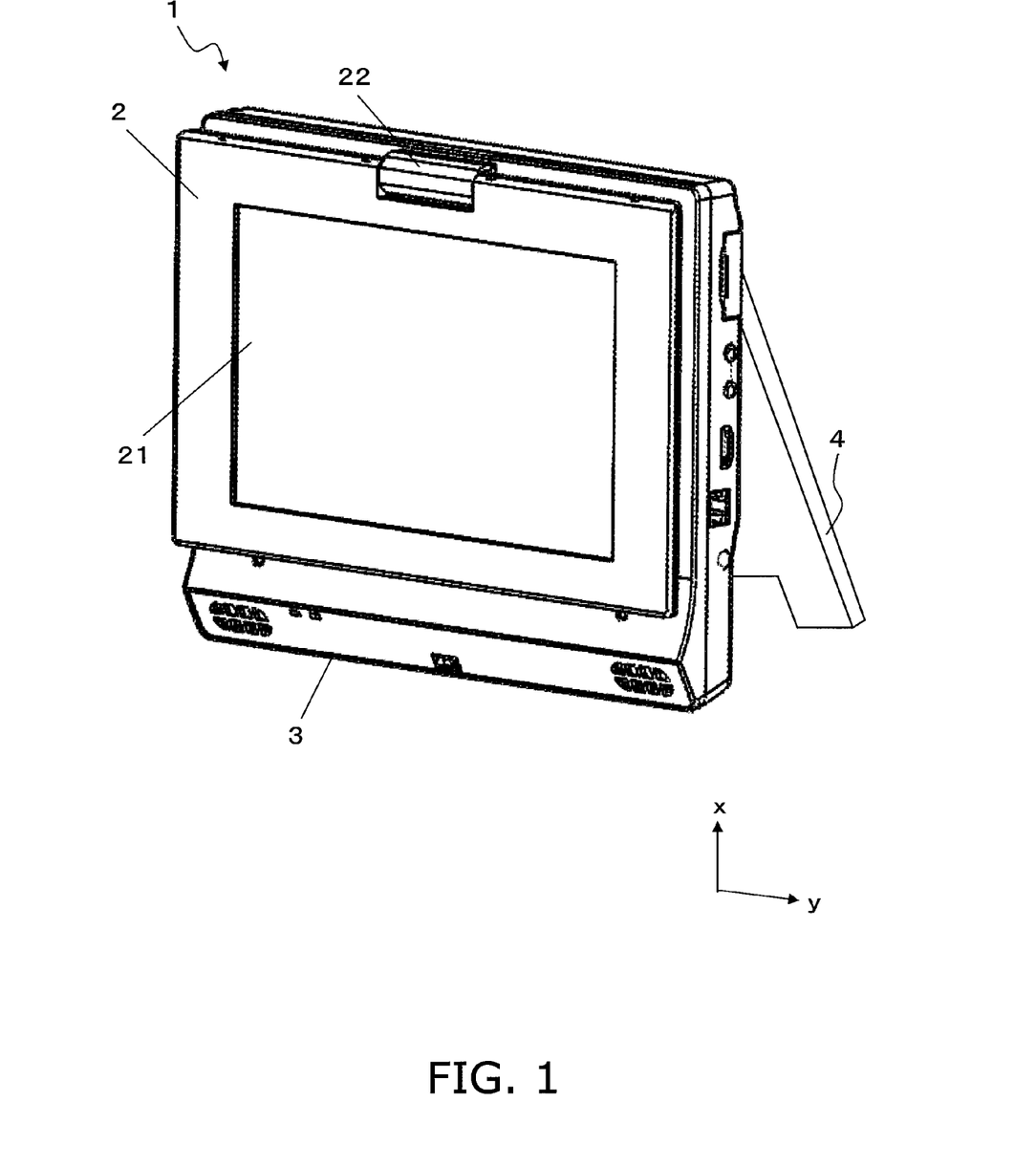
FIG. 1 is an oblique view of a reproduction device pertaining to an embodiment of the present invention.
Figure 2:
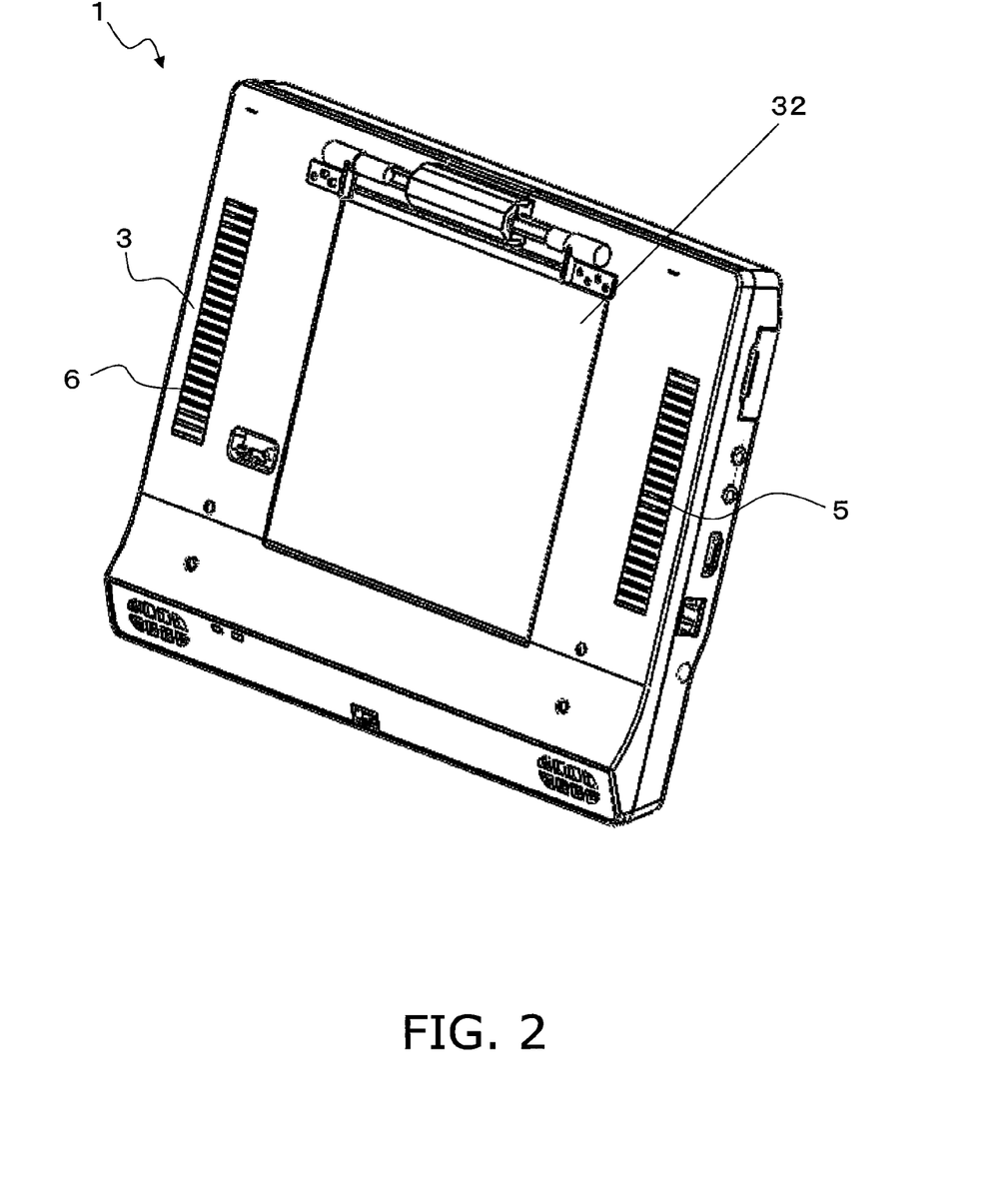
FIG. 2 is an oblique view of a second housing of the reproduction device pertaining to this embodiment.
Figure 3A:
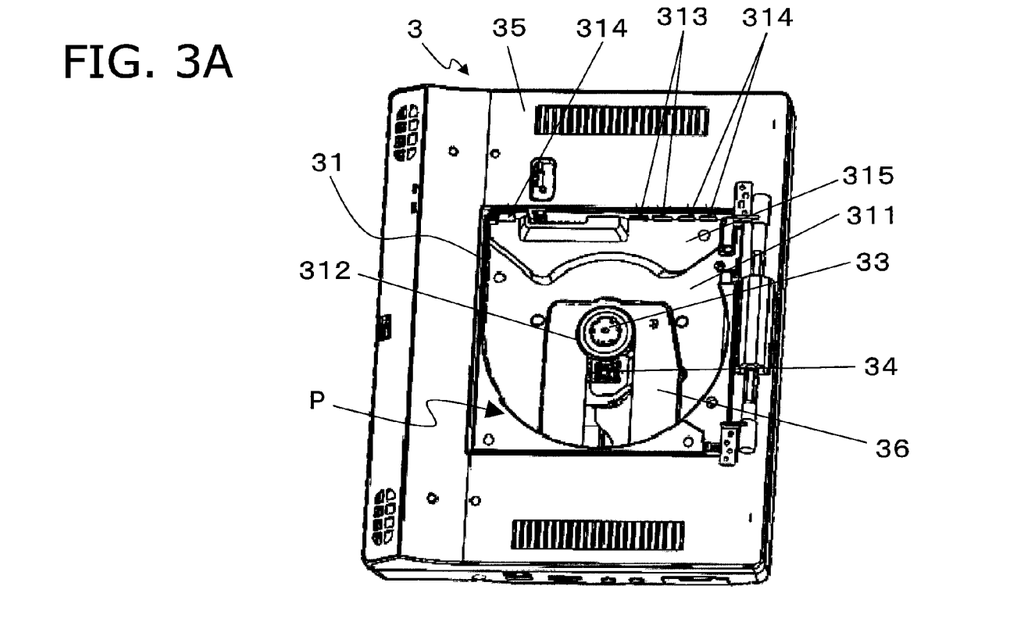
FIG. 3A is an oblique view of the second housing when the cover has been removed.
Figure 3B:
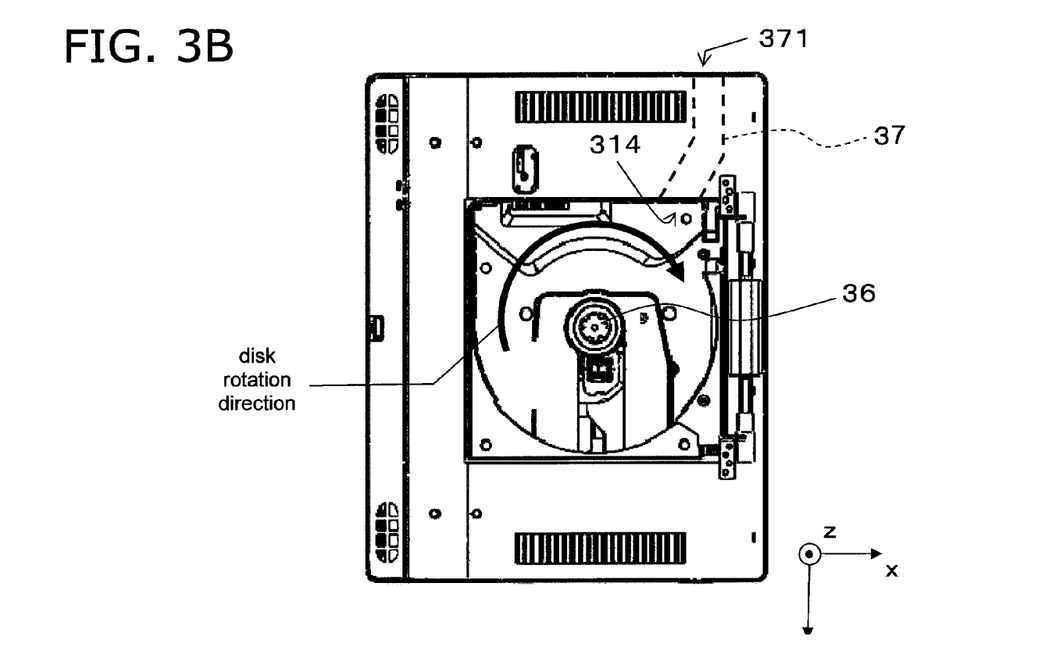
FIG. 3B is a front view of the second housing when the cover has been removed.
Figure 4A:
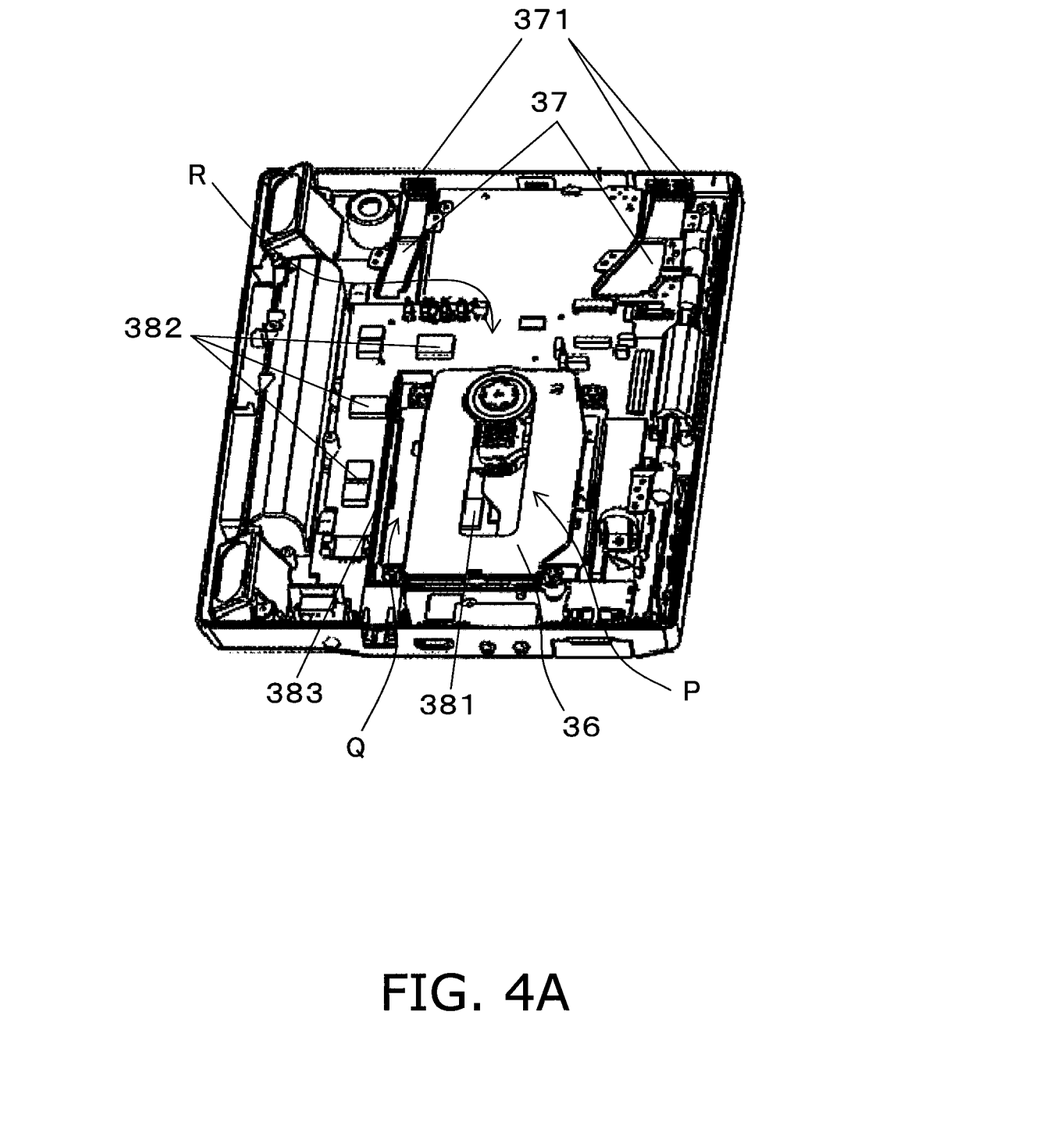
FIG. 4A is an oblique view of the inside of the second housing.
Figure 4B:
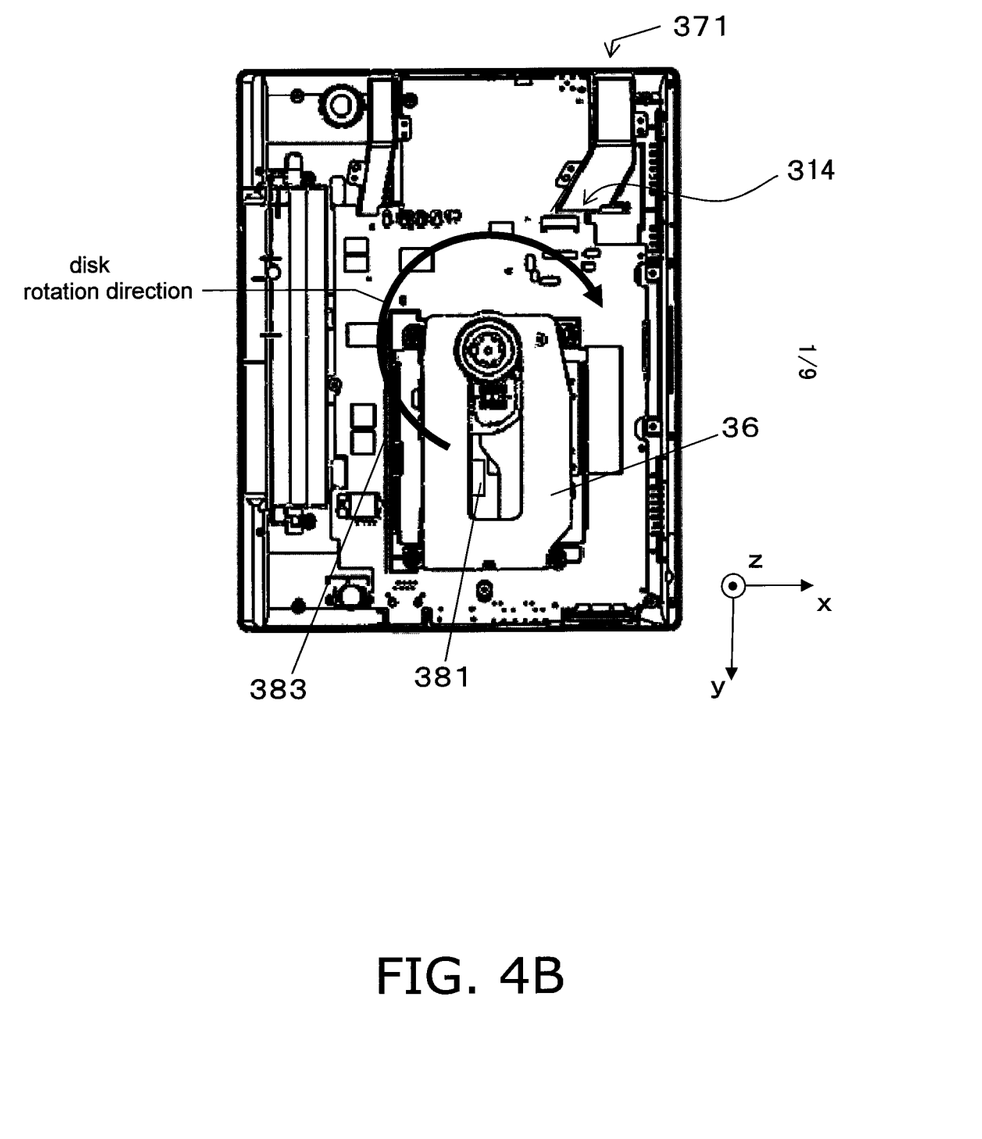
FIG. 4B is a front view of the inside of the second housing.
Figure 5:
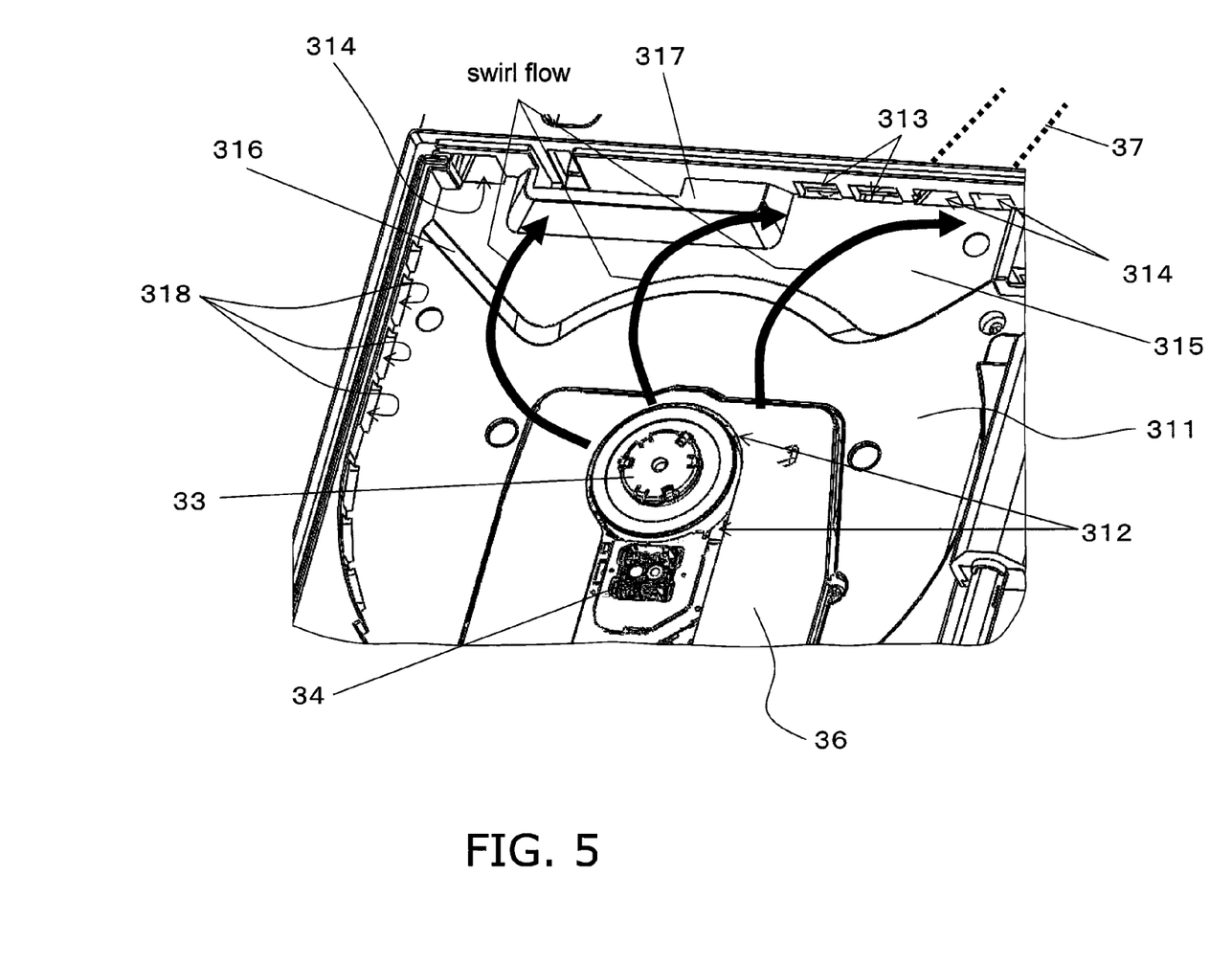
FIG. 5 is a partial enlargement of the holding component.

FIG. 1 is an oblique view of a reproduction device 1 pertaining to an embodiment of the present invention. FIG. 2 is an oblique view of a second housing 3 of the reproduction device 1 pertaining to this embodiment. FIG. 3A is an oblique view of the second housing 3 when a cover 32 of a holding component 31 that holds an optical disk has been removed. FIG. 3B is a front view of the same. FIG. 4A is an oblique view of the inside configuration of the second housing 3. FIG. 4B is a front view of the same. FIG. 5 is a partial enlargement of the holding component 31.

In this embodiment, the positive direction of the z axis shown in FIG. 3B (the direction oriented from the information recording surface of the held optical disk to the opposite surface opposed to the information recording surface) is called upward, and the negative direction of the z axis (the direction oriented from the opposite surface to the information recording surface of the held optical disk) is called downward.

1. Brief Description of the Configuration of the Reproduction Device 1

As shown in FIGS. 1 and 2, the reproduction device 1 has a first housing 2, a second housing 3, a leg 4, a first ventilation opening 5, and a second ventilation opening 6.

The first housing 2 and the second housing 3 are physically connected by a linking part 22. The first housing 2 and the second housing 3 are able to move with the linking part 22 as the fulcrum. The first housing 2 and the second housing 3 are also electrically connected.

The first housing 2 comprises a liquid crystal module 21. The second housing 3 comprises the holding component 31 that holds an optical disk (such as a CD, a DVD, or a Blu-Ray Disk), and a cover 32 that covers the holding component 31. The holding component 31 holds the optical disk, which is supported on a spindle mechanism 33, by being covered with the cover 32. The recorded information read from the optical disk is sent from the second housing 3 to the first housing 2, and displayed on the liquid crystal module 21. Such a configuration whereby recorded information is read from an optical disk and displayed is prior art, and will not be described in detail herein.

The leg 4 is provided on the opposite side from the first housing 2, with the second housing 3 in between. When the leg 4 is opened, the reproduction device 1 can be used in an erect state. The leg 4 is not shown in FIGS. 2 to 3B.

The first ventilation opening 5 and the second ventilation opening 6 are openings for ventilating between the interior of the second housing 3 and the exterior of the second housing 3. The first ventilation opening 5 and the second ventilation opening 6 have a function as an intake opening and a function as an exhaust opening.

2. Specific Description of the Configuration of the Second Housing 3

The second housing 3 reads recorded information from the held optical disk, and outputs this information to the first housing 2. As shown in FIG. 3, the second housing 3 comprises the holding component 31 that holds the optical disk, and an outer covering 35 that constitutes the outer package of the second housing 3. The holding component 31 and the outer covering 35 may be formed integrally, or may be constituted by separate members.

As shown in FIG. 3A, the holding component 31 forms a holding space P that holds an optical disk. The holding component 31 has a spindle mechanism 33 for supporting and rotating the optical disk, an optical pickup 34 for reading recorded information from the optical disk rotated by the spindle mechanism 33, and a mechanical part 36 for movably supporting the optical pickup 34.

The spindle mechanism 33 is constituted by a spindle motor or the like. The optical pickup 34 is constituted by a laser, a detector, a PBS, an objecting lens, or the like. The mechanical part 36 has an actuator or a driver, and movably supports the optical pickup 34 uniaxially.

The holding component 31 has a placement part 311 that faces the optical disk supported by the spindle mechanism 33, an intake channel 312 that is formed around the outside of the spindle mechanism 33 and links to a first internal space Q (discussed below), a first exhaust channel 313 that links to a second internal space R (discussed below), and a second exhaust channel 314 that links to the external space of the second housing 3 (the reproduction device 1).

The interior of the second housing 3 has the following configuration. As shown in FIG. 4, an IC chip 381 for controlling the spindle mechanism 33, the optical pickup 34, and the mechanical part 36, and power supply parts 382 for controlling the supply of power to the reproduction device 1 are provided under the holding component 31. The IC chip 381 is electrically connected to the spindle mechanism 33, the optical pickup 34, and the mechanical part 36.

The IC chip 381 is disposed in the first internal space Q formed outside the holding component 31. The holding space P and the first internal space Q are separated by the placement part 311 and the mechanical part 36. The power supply parts 382 are disposed in the second internal space R formed so as to surround the first internal space Q outside the holding component 31. The first internal space Q and the holding space P are linked by the intake channel 312.

Also, a rib 383 is provided between the power supply parts 382 and the optical pickup 34 to prevent sparking of the power supply parts 382 from spreading to the mechanical part 36. The rib 383 is made of a flame retardant material, and is provided protruding from the bottom face of the outer covering 35.

In this embodiment, the first internal space Q and the second internal space R are separated by the rib 383. The second internal space R and the holding space P are linked by the first exhaust channel 313.

As shown in FIGS. 4A and 4B, a duct 37 links the external space of the second housing 3 and the second exhaust channel 314. The duct 37 has an outer covering opening 371 formed facing the external space. As shown in FIG. 5, the duct 37 is formed in the direction in which air is made to flow by the rotation of the optical disk (that is, the forward direction of the swirl flow). In other words, as shown in FIGS. 3B and 4B, the duct 37 is such that the outer covering opening 371 is farther away from the spindle mechanism 33 than the second exhaust channel 314 in the x direction. Consequently, air is discharged without backing up into the swirl flow, so heat dissipation can be promoted more efficiently. This "swirl flow" refers to the flow of air generated by the rotation of the optical disk. The air flows between the placement part 311 and the optical disk while swirling outward in the radial direction from the spindle mechanism 33 (see FIGS. 6A and 6B).

The placement part 311 has a flow guide 315 that guides the swirl flow to the first exhaust channel 313 and the second exhaust channel 314. The flow guide 315 is a part of the placement part 311 that links to the openings of the first exhaust channel 313 and the second exhaust channel 314. As shown in FIG. 5, the flow guide 315 is formed by recessing part of the placement part 311 downward. Thus, the openings in the first exhaust channel 313 and the second exhaust channel 314 can be formed larger than when there is no flow guide 315. Also, the flow guide 315 is preferably recessed via a boundary 316 that is gently sloped. Doing this suppresses the generation of an eddy by the swirl flow at the boundary 316, so the swirl flow can be swirled more smoothly. As a result, heat dissipation can be promoted more efficiently.

Also, a convex portion 317 is formed in the flow guide 315. The convex portion 317 is formed at a position facing the outer periphery of the information recording surface of the optical disk. When the flow guide 315 is formed, there is a risk that the information recording surface will be scratched by the boundary 316 if pressure is applied to the optical disk during the placement of the optical disk. The convex portion 317 touches the outer periphery of the optical disk when the optical disk is pressed, and thereby prevents the boundary 316 and the information recording surface of the optical disk from touching. That is, the convex portion 317 reduces the risk that the information recording surface of the optical disk will be scratched by the boundary 316.

As shown in FIG. 5, a plurality of third exhaust channels 318 that lead to the second internal space R are formed in the inner wall face of the holding component 31. Therefore, the holding space P and the second internal space R are linked not only by the first exhaust channel 313, but also by the third exhaust channels 318.

3. Flow of Air During Operation of Second Housing 3

The flow of air generated when the second housing 3 rotates the optical disk will be described.

Figure 6A:
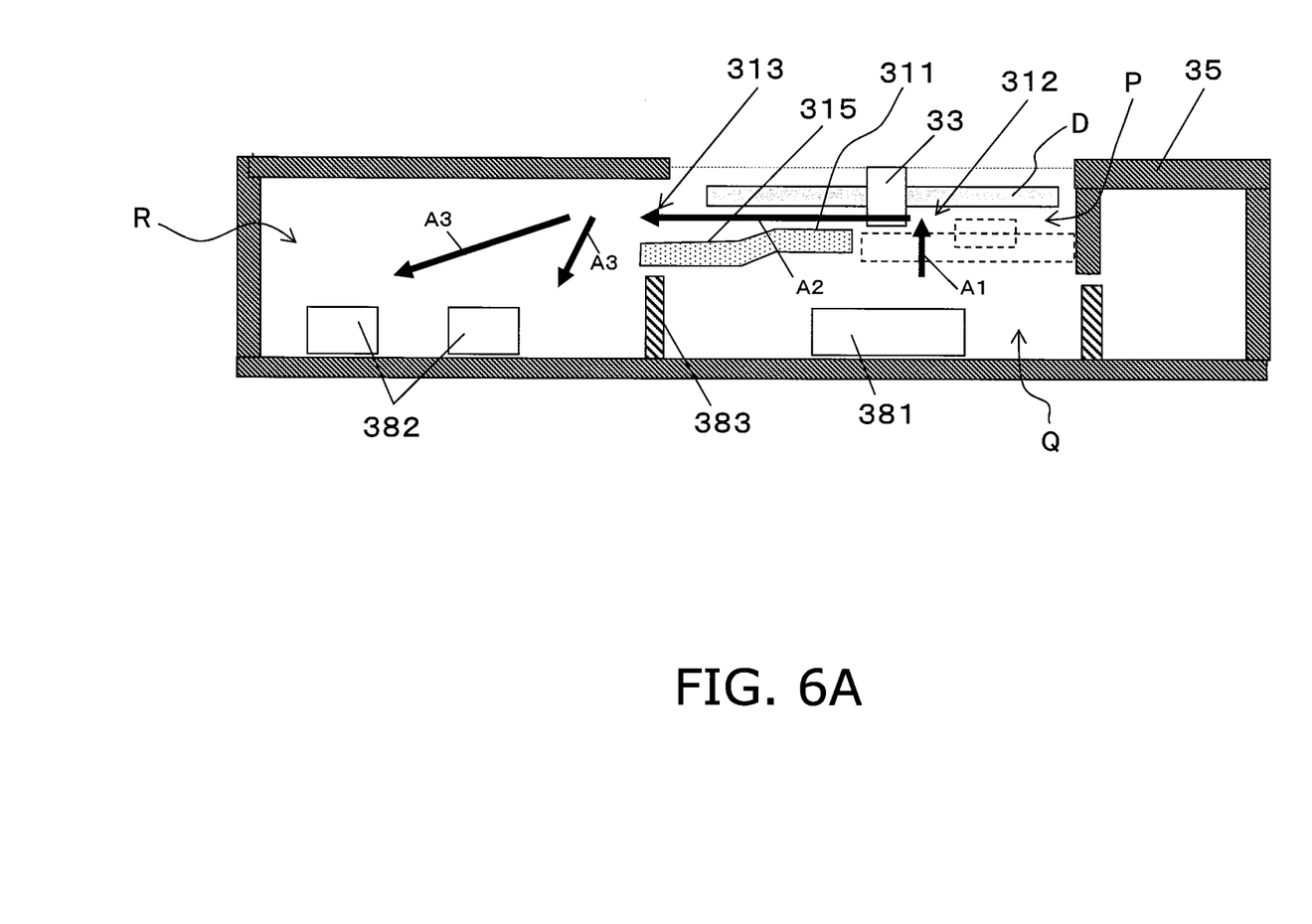
FIG. 6A is a schematic illustrating the flow of air from the intake channel to a first exhaust channel.
Figure 6B:
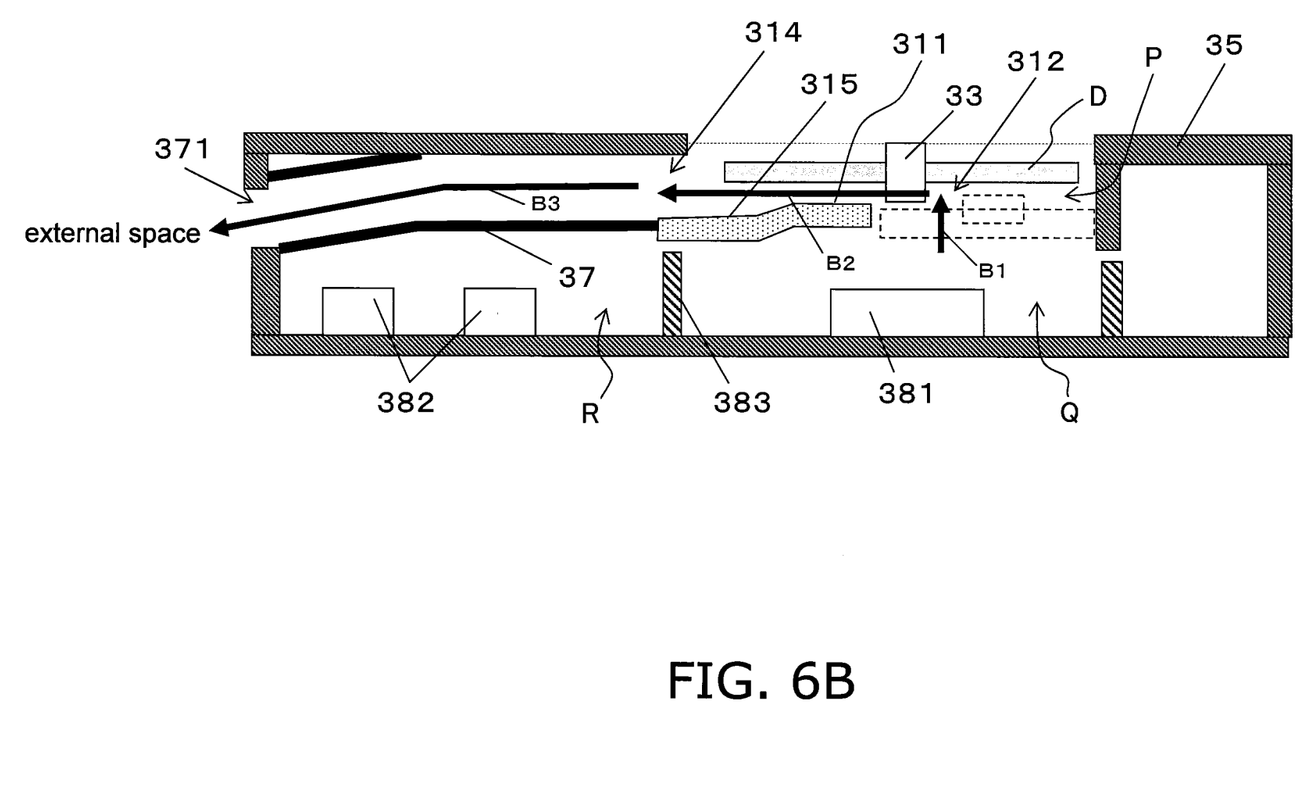
FIG. 6B is a schematic illustrating the flow of air from the intake channel to a second exhaust channel.

FIGS. 6A and 6B are schematic cross sections of the reproduction device 1, and illustrate the flow of air. Furthermore, FIGS. 6A and 6B schematically represent just a simplified configuration in order to facilitate understanding. FIG. 6A is a schematic illustrating the flow of air from the intake channel 312 to the first exhaust channel 313. FIG. 6B is a schematic illustrating the flow of air from the intake channel 312 to the second exhaust channel 314.

In FIG. 6A, when the optical disk D rotates, air is drawn from the first internal space Q in which the IC chip 381 is placed, through the intake channel 312, and into the holding space P (more specifically, the space between the placement part 311 and the optical disk D). This flow of air is indicated by the arrow A1 in the drawing. The air drawn in from the intake channel 312 becomes a swirl flow under the centrifugal force generated by the rotation of the optical disk D. This swirl flow swirls in the same direction as the rotation of the optical disk D, while flowing from the inside to the outside of the optical disk D. This flow of air is indicated by the arrow A2 in the drawing. The air drawn in from the intake channel 312 is carried by the swirl flow, flows over the flow guide 315, and flows into the first exhaust channel 313. The air that flows into the first exhaust channel 313 then flows into the second internal space R, and dissipates the heat inside the second internal space R. This flow of air is indicated by the arrow A3 in the drawing.

The effect of the air flow discussed above is that the air in the first internal space Q and the air in the second internal space R can be diffused efficiently. Specifically, the heat spots generated inside the reproduction device 1 can be reduced, so heat dissipation inside the reproduction device 1 can be efficiently promoted.

In FIG. 6B, when the optical disk D rotates, air is drawn from the first internal space Q, through the intake channel 312, and into the holding space P. This flow of air is indicated by the arrow B1 in the drawing. The air drawn in from the intake channel 312 becomes a swirl flow under the centrifugal force generated by the rotation of the optical disk D. This swirl flow swirls in the same direction as the rotation of the optical disk D, while flowing from the inside to the outside of the optical disk D. This flow of air is indicated by the arrow B2 in the drawing. The air drawn in from the intake channel 312 is carried by the swirl flow, flows over the flow guide 315, and flows into the second exhaust channel 314. The air that flows into the second exhaust channel 314 then flows through the duct 37 and is exhausted to the external space. This flow of air is indicated by the arrow B3 in the drawing.

The air flow discussed above allows the air in the first internal space Q to be efficiently discharged to the external space of the second housing 3. Therefore, heat dissipation inside the reproduction device 1 can be efficiently promoted.

The reproduction device 1 in this embodiment simultaneously has the two flows of air shown in FIGS. 6A and 6B. If heat diffusion in the second internal space R is emphasized, just the first exhaust channel 313 may be formed as an exhaust channel. If, however, waste heat in the first internal space Q is emphasized, just the second exhaust channel 314 may be formed as the exhaust channel.

Figure 7:
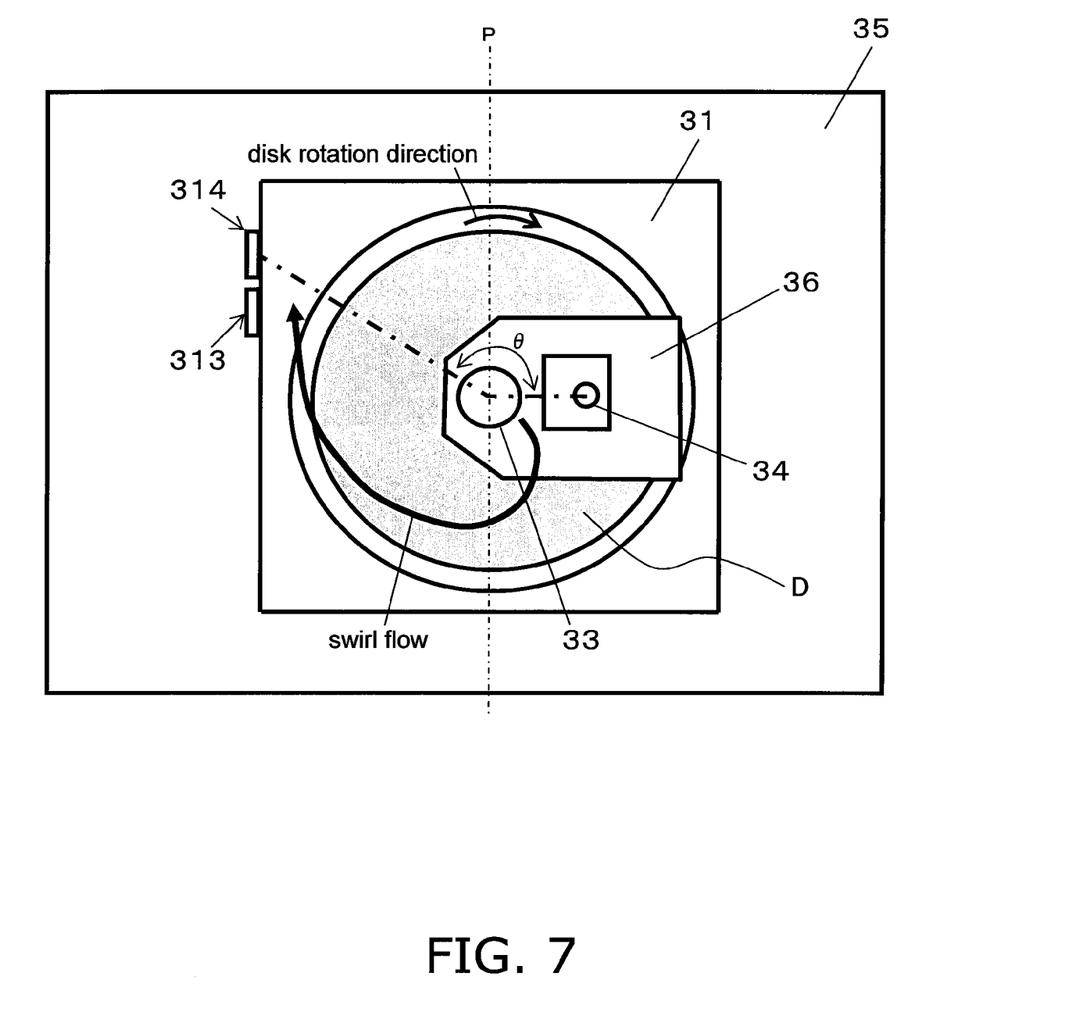
FIG. 7 is a schematic of the second housing as seen from above.

FIG. 7 is a schematic of the second housing 3 as seen from above, and is used to illustrate the flow of air. In the holding space P, turbulence tends to be caused by the effect of bumpiness or gaps near the mechanical part 36 or the optical pickup 34. However, the first exhaust channel 313 and the second exhaust channel 314 are formed on the opposite side from the optical pickup 34 with the spindle mechanism 33 in between. More precisely, the first exhaust channel 313 or the second exhaust channel 314 is formed at a position at which the angle θ formed by the line connecting the center of the spindle mechanism 33 with the first exhaust channel 313 or the second exhaust channel 314 (as viewed from above the holding component 31) and the line connecting the center of the spindle mechanism 33 with the optical pickup 34 is an obtuse angle. In other words, when viewed from above the holding component 31, the first exhaust channel or the second exhaust channel is formed on the opposite side from the optical pickup 34 and sandwiching a line P that is perpendicular to the line connecting the center of the spindle mechanism 33 and the optical pickup 34 and passing through the center of the spindle mechanism 33. Therefore, since the first exhaust channel 313 and the second exhaust channel 314 are formed at places that are less likely to be affected by turbulence, exhaust can be carried out efficiently from the first exhaust channel 313 and the second exhaust channel 314.

Recessing the placement part 311 at the flow guide 315 allows the first exhaust channel 313 and the second exhaust channel 314 to be formed larger. Specifically, the exhaust flow can be increased. As a result, heat dissipation can be promoted more efficiently.

In this embodiment, the IC chip 381 is an example of a first electronic component. The power supply parts 382 are an example of a second electronic component. The rib 383 is an example of a wall.

Also, in this embodiment, the IC chip 381 has a greater calorific value in a specific time period than the power supply parts 382. In this case, heat can be taken in from around the IC chip 381, which has a large calorific value, and can be exhausted to the power supply parts 382, which have a small calorific value, so the amount of heat can be equalized. This allows heat of the electronic components in the main body to be efficiently dissipated.

INDUSTRIAL APPLICABILITY

The electronic device of the present invention can be applied to devices that read information of the optical disk, such as DVD players, DVD recorders, Blu-Ray Disc players, and Blu-Ray Disc recorders.

EXPLANATION OF REFERENCE 1 reproduction device
2 first housing
3 second housing
4 leg
5 first ventilation opening
6 second ventilation opening
21 liquid crystal module
31 holding component
311 placement part
312 intake channel
313 first exhaust channel
314 second exhaust channel
318 third exhaust channel
315 flow guide
316 boundary
317 convex portion
32 cover
33 spindle mechanism
34 optical pickup
35 outer covering
36 mechanical part 37 duct
371 outer covering opening
381 IC chip
382 power supply part
383 rib
P holding space
Q first interior space
R second interior space

The invention claimed is:
1. An electronic device comprising:
a housing holding an optical disk;
a storing space storing the optical disk;
a rotary support portion supporting the optical disk and rotating the optical disk, and being provided within the storing space;
a pickup reading recorded data on the optical disk, and being provided movably in the storing space;
a first internal space being apart from the storing space and in which a first electronic component controlling the pickup is disposed;
an intake channel leading from the first internal space to the storing space; and
an exhaust channel leading from the storing space to a specific space being distinct from the first internal space;
a placement part facing the optical disk supported by the rotary support portion, and being provided in the storing space, the placement part positioned lower than the optical disk; and
a flow guide formed by recessing part of an outer edge portion of the placement part so as to be positioned lower than another portion of the placement part and communicating with the exhaust channel, the flow guide configured to guide air to the exhaust channel.

2. The electronic device according to claim 1, wherein, in the storing space, an opening of the intake channel is closer to the rotary support portion than an opening of the exhaust channel.

3. The electronic device according to claim 1, comprising:
a second internal space being apart from the storing space and in which a second electronic component is disposed; and
a wall separating the first internal space from the second space, wherein,
the specific space is the second internal space.

4. The electronic device according to claim 3, wherein, an average amount of heat generated by the first electronic component within a specific period is greater than an average amount of heat generated by the second electronic component.

5. The electronic device according to claim 1, wherein, the specific space is an external space of the housing.

6. The electronic device according to claim 5 comprising, comprising a duct linking the exhaust channel with the external space, wherein,
the duct is formed in the direction in which air is made to flow by the rotation of the optical disk.

7. The electronic device according to claim 1, wherein, an angle formed by the line connecting the exhaust channel and a center of the rotary support portion and the line connecting the pickup and the center of the rotary support portion is an obtuse angle.

8. The electronic device according to claim 1, wherein, the flow guide is formed by recessing part of the placement part via a boundary gently sloped.

9. The electronic device according to claim 1, wherein, the flow guide has a convex portion formed at a position facing the outer periphery of an information recording surface of the held optical disk.

* * * * *